US012624881B2

(12) United States Patent
Weaver

(10) Patent No.: US 12,624,881 B2
(45) Date of Patent: May 12, 2026

(54) CLEANING A STAND-ALONE ICE MAKING APPLIANCE

(71) Applicant: Haier US Appliance Solutions, Inc., Wilmington, DE (US)

(72) Inventor: Mark Aaron Weaver, Crestwood, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 71 days.

(21) Appl. No.: 18/596,136

(22) Filed: Mar. 5, 2024

(65) Prior Publication Data

US 2025/0283646 A1 Sep. 11, 2025

(51) Int. Cl.

| | |
|---|---|
| ***F25C 1/25*** | (2018.01) |
| ***B08B 9/032*** | (2006.01) |
| ***F25C 1/147*** | (2018.01) |

(52) U.S. Cl.

CPC .............. *F25C 1/25* (2018.01); *B08B 9/0321* (2013.01); *B08B 2209/032* (2013.01); *F25C 1/147* (2013.01); *F25C 2400/12* (2013.01); *F25C 2400/14* (2013.01)

(58) Field of Classification Search

CPC ........ F25C 1/25; F25C 1/147; F25C 2400/12; F25C 2400/14; F25C 5/182; B08B 9/0321; B08B 2209/032

USPC ............................................................ 62/303

See application file for complete search history.

(56) References Cited

U.S. PATENT DOCUMENTS 2,593,874 A * 4/1952 Grandia .................... F25C 1/12 62/352
2,775,100 A * 12/1956 Howe ....................... F25C 1/12 62/352
2,784,563 A * 3/1957 Baker ....................... F25C 1/12 62/352
4,635,824 A * 1/1987 Gaunt .................. B67D 1/0079 222/129.3

(Continued)

FOREIGN PATENT DOCUMENTS

CN 106918174 A * 7/2017 ................ F25C 1/00
CN 217005009 U 7/2022

(Continued)

OTHER PUBLICATIONS

KR 20130026969 A, machine translation (Year: 2025).*
KR-101779368-B1, machine translation (Year: 2025).*
CN-106918174-A, machine translation (Year: 2025).*

*Primary Examiner* — Len Tran
*Assistant Examiner* — Kirstin U Oswald
(74) *Attorney, Agent, or Firm* — Dority & Manning, P.A.

(57) ABSTRACT

A stand-alone ice making appliance includes an upper reservoir fluidly coupled to a lower reservoir via a first valve. An ice maker is disposed within the casing. A pump is disposed within the casing and is operable to flow water from the lower reservoir to upper reservoir and the ice maker. A controller is positioned in the casing. A method of operating the stand-alone ice making appliance includes opening the first valve between the upper reservoir and the lower reservoir. The method also includes draining the liquid from the upper reservoir to the lower reservoir and closing the first valve between the upper reservoir and the lower reservoir. The method further includes operating a descale or cleaning operation of the stand-alone ice making appliance.

18 Claims, 5 Drawing Sheets

(56) References Cited

U.S. PATENT DOCUMENTS

| | | | | | |
|---|---|---|---|---|---|
| 6,324,863 | B1 * | 12/2001 | Henry | C02F 1/4674 62/347 |
| 6,334,328 | B1 * | 1/2002 | Brill | A23G 9/325 62/347 |
| 6,619,051 | B1 * | 9/2003 | Kilawee | A61L 2/24 62/348 |
| 6,857,284 | B1 * | 2/2005 | Brooks | F25C 1/147 62/303 |
| 9,273,894 | B1 * | 3/2016 | Whitty | F25C 1/00 |
| 10,139,145 | B2 * | 11/2018 | DuPlessis | F25C 5/142 |
| 10,156,393 | B2 * | 12/2018 | Tarr | F25C 5/142 |
| 10,370,260 | B2 * | 8/2019 | Chernov | C02F 1/003 |
| 10,520,236 | B2 * | 12/2019 | Tarr | F25C 5/142 |
| 2009/0301587 | A1 * | 12/2009 | Takagi | F25C 1/24 62/340 |
| 2011/0232304 | A1 * | 9/2011 | Bortoletto | F24F 6/00 700/282 |
| 2011/0232312 | A1 * | 9/2011 | Bortoletto | F25D 17/042 62/274 |
| 2012/0277906 | A1 * | 11/2012 | Fassberg | A23G 9/045 62/126 |
| 2013/0174875 | A1 * | 7/2013 | Walker | B08B 9/027 62/303 |
| 2016/0003515 | A1 | 1/2016 | Brunner et al. | |
| 2018/0010837 | A1 * | 1/2018 | Miller | F25C 5/182 |
| 2018/0073792 | A1 * | 3/2018 | Tarr | C02F 1/325 |
| 2019/0316824 | A1 * | 10/2019 | Tarr | F25D 17/02 |
| 2020/0224949 | A1 * | 7/2020 | Kandi | F25C 5/22 |
| 2022/0107127 | A1 | 4/2022 | Mitchell et al. | |
| 2022/0221212 | A1 * | 7/2022 | Carr | F25C 5/22 |
| 2023/0108527 | A1 * | 4/2023 | Junge | F25D 1/02 99/323.2 |

FOREIGN PATENT DOCUMENTS

| | | | | | |
|---|---|---|---|---|---|
| KR | 20110054760 | A | * | 5/2011 | |
| KR | 20130026969 | A | * | 3/2013 | F25C 5/185 |
| KR | 101779368 | B1 | * | 9/2017 | F25C 1/10 |
| WO | WO2022135575 | A1 | | 6/2022 | |

* cited by examiner

CLEANING A STAND-ALONE ICE MAKING APPLIANCE

FIELD OF THE INVENTION

The present subject matter relates generally to ice making appliances, and more particularly to systems and methods for cleaning components of stand-alone ice making appliances.

BACKGROUND OF THE INVENTION

Ice makers generally produce ice for use by consumers, such as in beverages, for cooling food items, etc. Certain refrigerator appliances include ice makers for producing ice. The ice maker can be positioned within the appliance's freezer chamber and direct ice into an ice bucket where the ice is stored within the freezer chamber. Such refrigerator appliances can also include a dispensing system for assisting a user with accessing ice produced by the refrigerator appliance's ice maker. However, the incorporation of ice makers into refrigerator appliances can have drawbacks, such as limits on the amount of ice that can be produced and the reliance on the refrigeration system of the refrigerator appliance to form the ice.

Stand-alone ice makers are separate from refrigerator appliances and provide independent ice supplies. Generally, liquid water is added to the stand-alone ice makers, and the ice makers operate to freeze the liquid water and form ice. Users frequently add tap water to the stand-alone ice makers. Tap water may include various impurities that negatively affect the appearance and/or taste of ice cubes formed from the tap water. Further, tap water may, over time, lead to scale buildup within the ice maker.

Traditional methods of cleaning some ice makers may include moving the whole ice machine closer to a sink or use a big bucket to drain the water used to clean and rinse, which is manually intensive. Accordingly, a system for cleaning an ice maker that removes the manual intensity of traditional methods would be advantageous.

BRIEF DESCRIPTION OF THE INVENTION

Aspects and advantages of the invention will be set forth in part in the following description, or may be obvious from the description, or may be learned through practice of the invention.

In one example embodiment, A stand-alone ice making appliance is provided. The stand-alone ice making appliance includes a casing and a user interface on the casing. A container is within the casing. A lower reservoir is removably mounted beneath the container. An upper reservoir is disposed within the casing. The upper reservoir is fluidly coupled to the lower reservoir via a first valve. An ice maker is disposed within the casing. A pump is disposed within the casing and is in fluid communication with each of the lower reservoir, the upper reservoir, and the ice maker. The pump is operable to flow water from the lower reservoir to the upper reservoir and the ice maker. A controller is positioned in the casing and is in signal communication with the first valve between the upper reservoir and the lower reservoir. The controller is configured to open the first valve between the upper reservoir and the lower reservoir. The controller is also configured to drain the liquid from the upper reservoir to the lower reservoir and close the first valve between the upper reservoir and the lower reservoir. The controller is further configured to operate a descale or cleaning operation of the stand-alone ice making appliance.

In another example embodiment, a method of operating a stand-alone ice making appliance is provided. The stand-alone ice making appliance includes a casing and a user interface on the casing. A container is within the casing. A lower reservoir is removably mounted beneath the container. An upper reservoir is disposed within the casing. The upper reservoir is fluidly coupled to the lower reservoir via a first valve. An ice maker is disposed within the casing. A pump is disposed within the casing and is in fluid communication with each of the lower reservoir, the upper reservoir, and the ice maker. The pump is operable to flow water from the lower reservoir to the upper reservoir and the ice maker. A controller is positioned in the casing and is in signal communication with the first valve between the upper reservoir and the lower reservoir. The method includes opening the first valve between the upper reservoir and the lower reservoir. The method also includes draining the liquid from the upper reservoir to the lower reservoir and closing the first valve between the upper reservoir and the lower reservoir. The method further includes operating a descale operation of the stand-alone ice making appliance.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
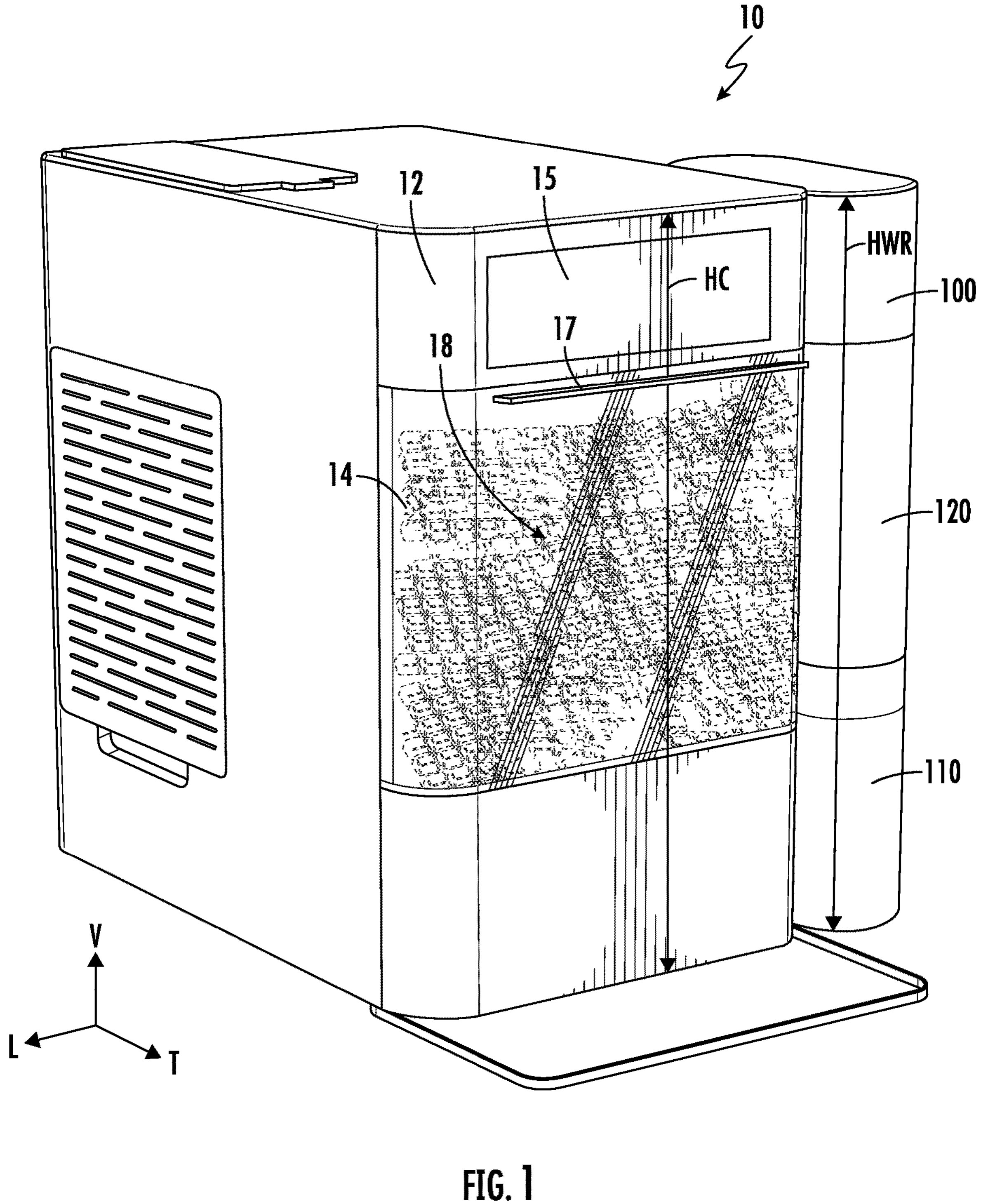
FIG. 1 is a perspective view of an appliance according to an example embodiment of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a ten percent (10%) margin.

Figure 2:
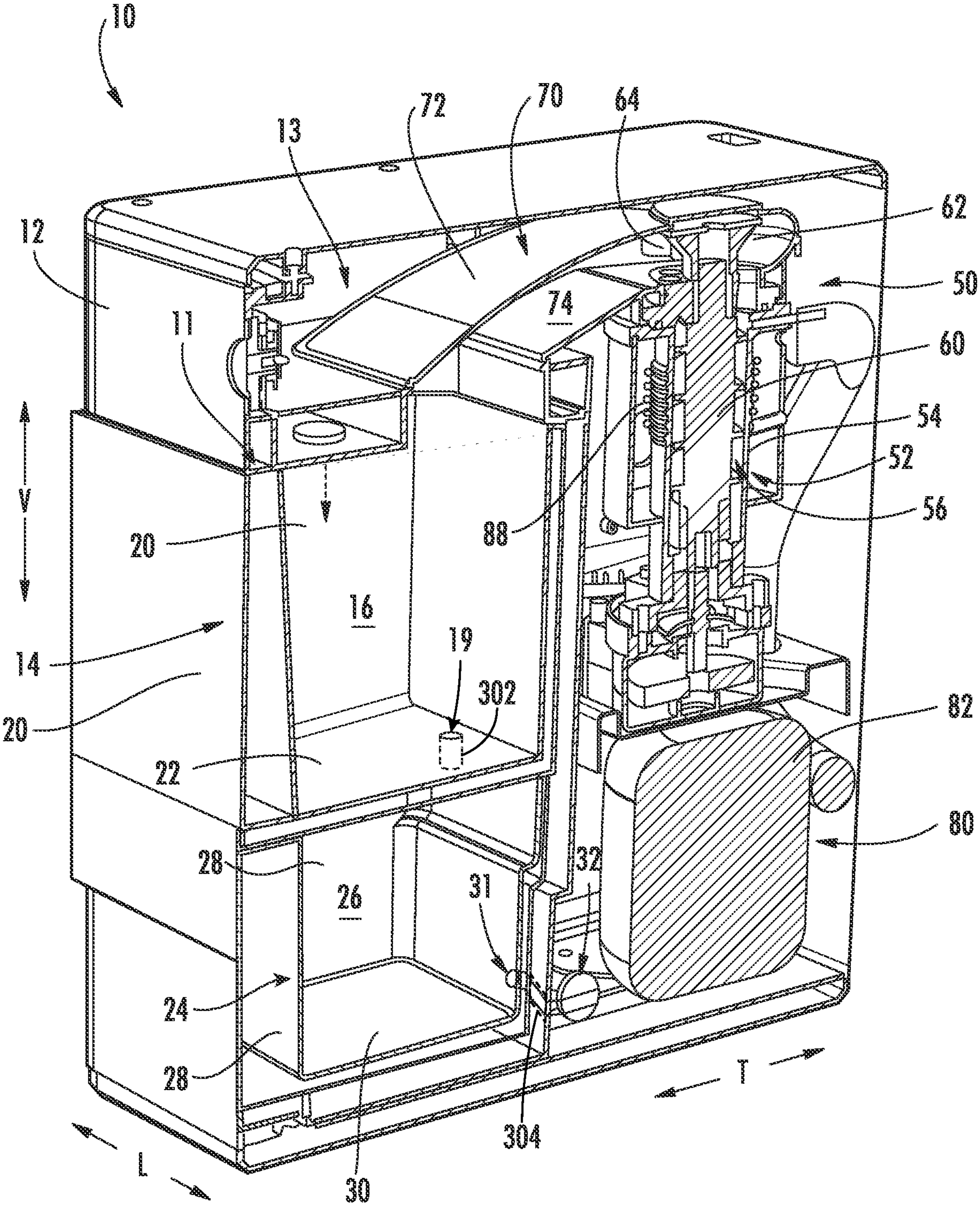
FIG. 2 is a perspective section view of the example appliance of FIG. 1.
Figure 3:
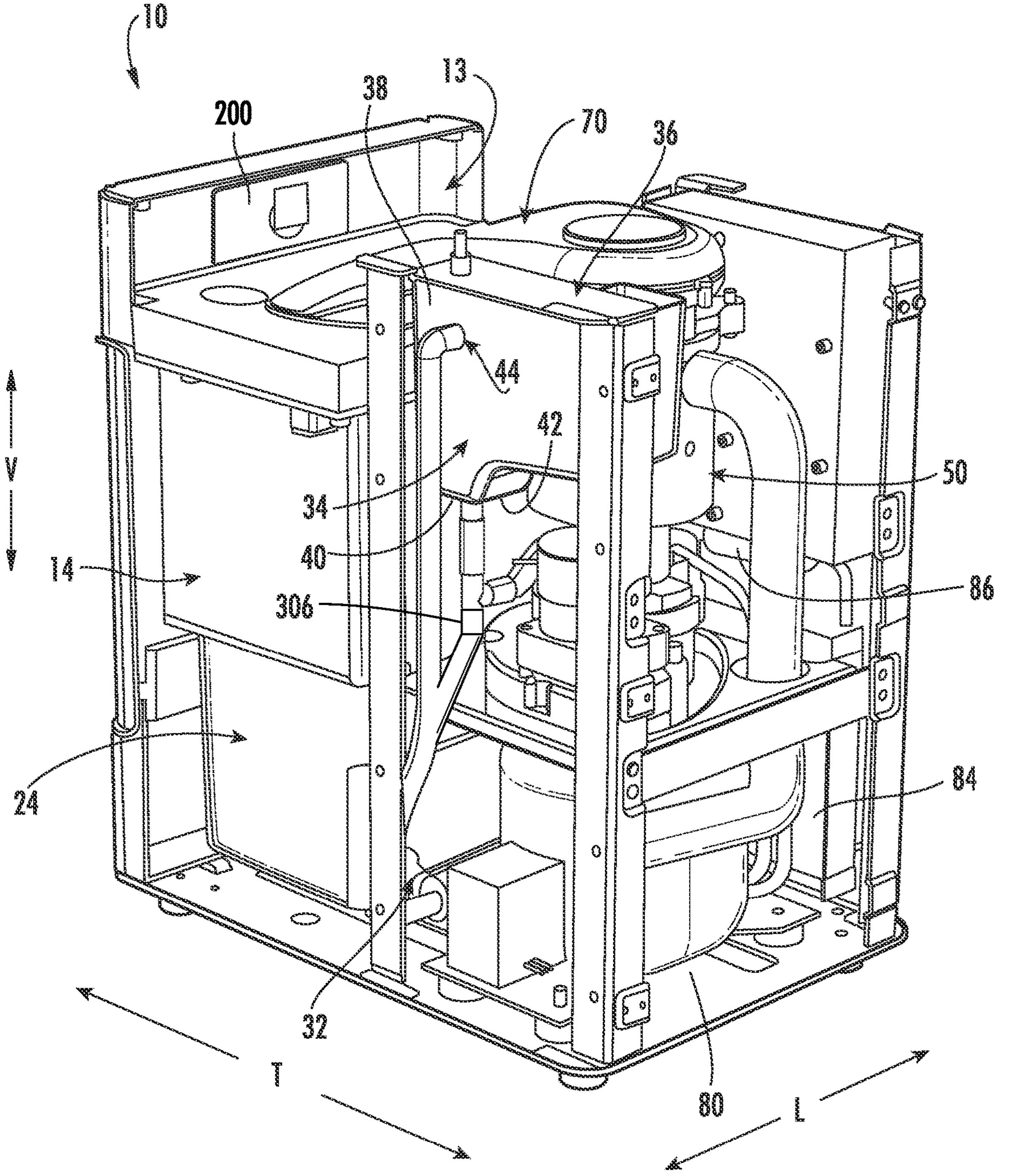
FIG. 3 is a rear perspective view of the example appliance of FIG. 1 with a casing of the example appliance removed to show interior components of the example appliance.

Referring now to FIGS. 1 through 3, one embodiment of an appliance 10 in accordance with the present disclosure is illustrated. As shown, appliance 10 is provided as a stand-alone ice making appliance embodiment. Appliance 10 includes an outer casing 12 which defines a primary opening 11 (e.g., first primary opening) and an internal cavity or volume 13. Internal volume 13 generally at least partially houses various other components of the appliance therein 10. Primary opening 11 defined in outer casing 12 may extend internal volume 13 to an ambient environment. Through primary opening 11, access (e.g., by a user) to the internal volume 13 may be permitted. Outer casing 12 further defines a vertical direction V, a lateral direction L, and a transverse direction T. The vertical direction V, lateral direction L, and transverse direction T are mutually perpendicular and form an orthogonal direction system.

A container 14 of appliance 10 is also illustrated. Container 14 defines a first storage volume 16 for the receipt and storage of ice 18 therein. A user of the appliance 10 may access ice 18 within the container 14 for consumption or other uses, as described in detail below. Container 14 may include multiple walls, including one or more sidewalls 20 and a base wall 22, which may together define the first storage volume 16. In example embodiments, at least one sidewall 20 may be formed in part from a clear, see-through (i.e., transparent, or translucent) material, such as a clear glass or plastic, such that a user can see into the first storage volume 16 and thus view ice 18 therein. For instance, at least one sidewall 20 may include a separate external panel and internal panel formed from a clear, see-through (i.e., transparent, or translucent) material, such as a clear glass or plastic. In some example embodiments, container 14 may include a handle 17. In general, handle 17 may advantageously improve accessibility to ice 18 within container 14. Further, in example embodiments, container 14 may be removable, such as from the outer casing 12, by a user. This facilitates advantageous easy access by the user to ice within the container 14, as discussed below. In general, a user interface 15 may be positioned on casing 12 above container 14. The user interface 15 may generally include input selectors to be selected (e.g., by a user) for controlling the appliance 10.

Appliances 10 in accordance with the present disclosure are advantageously stand-alone appliances, and thus are not connected to refrigerators or other appliances. Additionally, in example embodiments, such appliances are not connected to plumbing or another water source that is external to the appliance 10, such as a refrigerator water source. Rather, in example embodiments, water is initially supplied to the appliance 10 manually by a user, such as by pouring water into reservoir 24 and/or an auxiliary reservoir 100. Optionally, in example embodiments, reservoir 24 may be removable, such as from the outer casing 12, by a user. This facilitates advantageous easy access by the user to reservoir 24 (e.g., in order to easily fill reservoir 24), as discussed below.

Notably, appliances 10 as discussed herein include various features which allow the appliances 10 to be affordable and desirable to typical consumers. For example, the stand-alone feature reduces the cost associated with the appliance 10 and allows the consumer to position the appliance 10 at any suitable desired location, with the only requirement in some embodiments being access to an electrical source. In example embodiments, such as those shown in FIGS. 1 through 3, the removable container 14 allows easy access to ice 18 within first storage volume 16 and allows the container 14 to be moved to a different position from the remainder of the appliance 10 for ice usage purposes.

As discussed herein, appliance 10 is configured to make nugget ice, which is becoming increasingly popular with consumers. Ice 18 may be nugget ice. Generally, nugget ice is ice that that is maintained or stored (i.e., in first storage volume 16 of container 14) at a temperature greater than the melting point of water or greater than about thirty-two degrees Fahrenheit. Accordingly, the ambient temperature of the environment surrounding the container 14 may be at a temperature greater than the melting point of water or greater than about thirty-two degrees Fahrenheit. In some embodiments, such temperature may be greater than forty degrees Fahrenheit, greater than fifty degrees Fahrenheit, or greater than sixty degrees Fahrenheit.

Still referring to FIGS. 1 through 3, various components of appliance 10 in accordance with the present disclosure are illustrated. For example, as mentioned, appliance 10 includes a reservoir 24, otherwise referred to as a lower reservoir 24. The reservoir 24 defines a second storage volume 26 for the receipt and holding of water. Reservoir 24 may include multiple walls, including one or more sidewalls 28 and a base wall 30, which may together define the second storage volume 26. In example embodiments, the reservoir 24 may be disposed below the container 14 along the vertical direction V defined for the appliance 10, as shown. In the present example embodiment, reservoir 24 may be removable from appliance 10, as will be further described hereinbelow.

As discussed, in example embodiments, water is provided to the reservoir 24 for use in forming ice. Accordingly, appliance 10 may further include a pump 32. Pump 32 may be in fluid communication with the second storage volume 26. For example, water may be flowable from the second storage volume 26 through a fluid outlet 31 defined in the reservoir 24, such as in a sidewall 28 thereof, and may flow through a conduit to and through pump 32. Pump 32 may, when activated, be operable to actively flow water from the second storage volume 26 therethrough and from the pump 32.

Water actively flowed from the pump 32 may be flowed (e.g., through a suitable conduit) to a reservoir 34, otherwise referred to as an upper reservoir 34. For example, reservoir 34 may define a third storage volume 36. In some embodiments, third storage volume 36 is defined by one or more sidewalls 38 and a base wall 40. Third storage volume 36 may, for example, be in fluid communication with the pump 32 and may thus receive water that is actively flowed from the reservoir 24, such as through the pump 32. During operation, water may be flowed into the third storage volume 36 through an opening 44 defined in reservoir 34.

Referring still to FIGS. 1 through 3, reservoir 34 and third storage volume 36 thereof may receive and contain water to be provided to an ice maker 50 for the production of ice. Accordingly, third storage volume 36 may be in fluid communication with ice maker 50. For example, water may be flowed, such as through an opening 42 and through suitable conduits, from third storage volume 36 to ice maker 50.

Ice maker 50 generally receives water, such as from reservoir 34, and freezes the water to form ice 18. In example embodiments, ice maker 50 is a nugget ice maker, and in particular is an auger-style ice maker, although other suitable styles of ice makers and/or appliances are within the scope and spirit of the present disclosure. As shown, ice maker 50 may include a casing 52 into which water from third storage volume 36 is flowed. Casing 52 is thus in fluid communication with third storage volume 36. For example, casing 52 may include one or more sidewalls 54 which may define an interior volume 56, and an opening may be defined in a sidewall 54. Water may be flowed from third storage volume 36 through the opening (such as via a suitable conduit) into the interior volume 56.

As illustrated, an auger 60 may be disposed at least partially within the casing 52. During operation, the auger 60 may rotate. Water within the casing 52 may at least partially freeze due to heat exchange, such as with a refrigeration system as discussed herein. The at least partially frozen water may be lifted by the auger 60 from casing 52. Further, in example embodiments, the at least partially frozen water may be directed by auger 60 to and through an extruder 62. The extruder 62 may extrude the at least partially frozen water to form ice, such as nuggets of ice 18.

Formed ice 18 may be provided by the ice maker 50 to container 14, and may be received in the first storage volume 16 thereof. For example, ice 18 formed by auger 60 and/or extruder 62 may be provided to the container 14. In example embodiments, appliance 10 may include a chute 70 for directing ice 18 produced by the ice maker 50 towards the first storage volume 16. For example, as shown, chute 70 is generally positioned above container 14 along the vertical direction V. Thus, ice can slide off of chute 70 and drop into storage volume 16 of container 14. Chute 70 may, as shown, extend between ice maker 50 and container 14, and may include a body 72, which defines a passage 74 therethrough. Ice 18 may be directed from the ice maker 50 (such as from the auger 60 and/or extruder 62) through the passage 74 to the container 14. In some embodiments, for example, a sweep 64, which may be connected to and rotate with the auger, may contact the ice emerging through the extruder 62 from the auger 60 and direct the ice 18 through the passage 74 to the container 14.

As discussed, water within the casing 52 may at least partially freeze due to heat exchange, such as with a refrigeration system. In example embodiments, ice maker 50 may include a sealed refrigeration system 80. The sealed refrigeration system 80 may be in thermal communication with the casing 52 to remove heat from the casing 52 and interior volume 56 thereof, thus facilitating freezing of water therein to form ice. Sealed refrigeration system 80 may, for example, include a compressor 82, a condenser 84, a throttling device 86, and an evaporator 88. Evaporator 88 may, for example, be in thermal communication with the casing 52 in order to remove heat from the interior volume 56 and water therein during operation of sealed system 80. For example, evaporator 88 may at least partially surround the casing 52. In particular, evaporator 88 may be a conduit coiled around and in contact with casing 52, such as the sidewall(s) 54 thereof.

It should additionally be noted that, in example embodiments, a controller 200 may be in operative communication with the sealed system 80, such as with the compressor 82 thereof, and may activate the sealed system 80 as desired or required for ice making purposes.

For example, appliance 10 may include a controller 200 disposed within casing 312. For example, controller 200 may be generally configured to facilitate operation of appliance 10. In this regard, user interface 15 may be in communication with controller 200 such that controller 200 may receive control inputs from user interface 15 and may otherwise regulate operation of appliance 10. For example, signals generated by controller 200 may operate appliance 10, including any or all system components, subsystems, or interconnected devices, in response to the position of user interface 15 and other control commands. Specifically, draining and/or pumping fluid to/from appliance 10 may occur in response to a user input on user interface 15. For example, the user interface 15 may receive the user input, e.g., a button press, a touch on a touchscreen interface, etc., and the user interface 15 may generate a corresponding signal in response to the user input and such signal may be transmitted to the controller 200. Other components of appliance 10 may be in communication with controller 200 via, for example, one or more signal lines or shared communication busses. In this manner, Input/Output ("I/O") signals may be routed between controller 200 and various operational components of appliance 10.

As used herein, the terms "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate appliance operation. Alternatively, controller 200 may be constructed without using a microprocessor, e.g., using a combination of discrete analog and/or digital logic circuitry (such as switches, amplifiers, integrators, comparators, flip-flops, AND/OR gates, and the like) to perform control functionality instead of relying upon software.

Controller 200 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor or may be included onboard within the processor. In addition, these memory devices can store information and/or data accessible by the one or more processors, including instructions that can be executed by the one or more processors. It should be appreciated that the instructions can be software written in any suitable programming language or can be implemented in hardware. Additionally, or alternatively, the instructions can be executed logically and/or virtually using separate threads on one or more processors.

For example, controller 200 may be operable to execute programming instructions or micro-control code associated with an operating cycle of appliance 10. In this regard, the instructions may be software or any set of instructions that when executed by the processing device, cause the processing device to perform operations, such as running one or more software applications, displaying a user interface, receiving user input, processing user input, etc. Moreover, it should be noted that controller 200 as disclosed herein is capable of and may be operable to perform any methods, method steps, or portions of methods as disclosed herein. For example, in some embodiments, methods disclosed herein may be embodied in programming instructions stored in the memory and executed by controller 200.

The memory devices may also store data that can be retrieved, manipulated, created, or stored by the one or more processors or portions of controller 200. The data can include, for instance, data to facilitate performance of methods described herein. The data can be stored locally (e.g., on controller 200) in one or more databases and/or may be split up so that the data is stored in multiple locations. In addition, or alternatively, the one or more database(s) can be connected to controller 200 through any suitable network(s), such as through a high bandwidth local area network (LAN) or wide area network (WAN). In this regard, for example, controller 200 may further include a communication module or interface that may be used to communicate with one or more other component(s) of appliance 10, controller 200, an external appliance controller, or any other suitable device, e.g., via any suitable communication lines or network(s) and using any suitable communication protocol. The communication interface can include any suitable components for interfacing with one or more network(s), including for example, transmitters, receivers, ports, controllers, antennas, or other suitable components.

In example embodiments, controller 200 is in operative communication with the pump 32. Such operative communication may be via a wired or wireless connection, and may facilitate the transmittal and/or receipt of signals by the controller 200 and pump 32. Controller 200 may be configured to activate the pump 32 to actively flow water. For example, controller 200 may activate the pump 32 to actively flow water therethrough when, for example, reservoir 34 requires water. A suitable sensor(s), for example, may be provided in the third storage volume 36. The sensor(s) may be in operative communication with the controller 200 and may be configured to transmit signals to the controller 200, which indicate whether or not additional water is desired in the reservoir 34. When controller 200 receives a signal that water is desired, controller 200 may send a signal to pump 32 to activate pump 32.

As shown in FIG. 1, appliance 10 may also include an auxiliary water reservoir 100. A height HWR of auxiliary water reservoir 100 may be about equal to a height HC of casing 12. Thus, the appearance of auxiliary water reservoir 100 may complement casing 12. Auxiliary water reservoir 100 may be disposed outside of casing 12. For example, auxiliary water reservoir 100 may be mounted at the side of casing 12. Thus, while most components of appliance 10 are housed within casing 12, auxiliary water reservoir 100 is positioned outside of casing 12. In certain example embodiments, auxiliary water reservoir 100 may include a base 110 and a container 120. Base 110 may be attached to casing 12, e.g., at the side of casing 12 adjacent to the bottom of casing 12. For instance, base 110 may be clipped, fastened, etc. to casing 12.

Auxiliary water reservoir 100 may be in fluid communication with a water tank within casing 12 such that water within auxiliary water reservoir 100 is flowable to the water tank. For example, a flexible tubing conduit, or a supply line may extend from auxiliary water reservoir 100 to reservoir 24, whereby water from within auxiliary water reservoir 100 may flow from auxiliary water reservoir 100 into second storage volume 26. It will be understood that appliance 10 may be plumbed in any other suitable manner to deliver water from auxiliary water reservoir 100 into casing 12 for use with ice maker 50 in alternative example embodiments.

Figure 4:
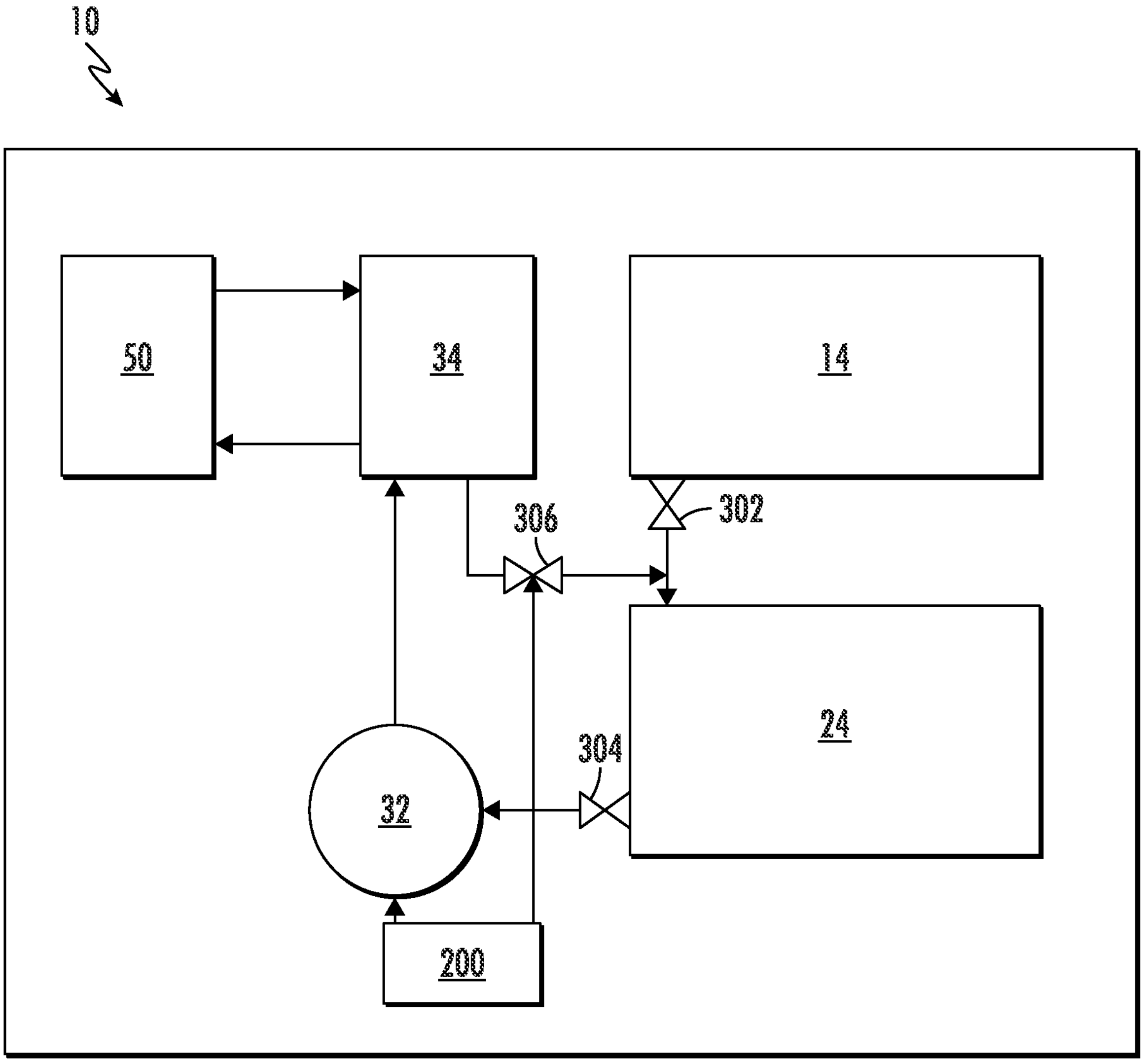
FIG. 4 is a schematic view of components of the example appliance of FIG. 1, according to aspects of the present disclosure.

Referring now to FIG. 4, provided is a schematic including various components of appliance 10. In particular, shown is upper reservoir 34 fluidly coupled to lower reservoir 24 via a first valve 306. Furthermore, controller 200 may be in operative communication with first valve 306. For example, controller 200 may generally be able to open and close first valve 306, and drain upper reservoir 34 into lower reservoir 24, in response to user input(s) on user interface 15 (FIG. 1). For example, when first valve 316 is open, fluid may drain via gravity from upper reservoir 34 to lower reservoir 24. In some example embodiments, first valve 306 may include a siphon extending into upper reservoir 34, thereby fluid may be siphoned from upper reservoir 34 into the lower reservoir 24. During normal operation of appliance 10, water hardness minerals from the fluid used to make ice may concentrate within ice maker 50 and upper reservoir 34. Accordingly, controller 200 may generally be configured to operate a descale operation. For example, the descale operation may generally include pumping fluid, such as a descale solution (vinegar), from lower reservoir 24 to upper reservoir 34, through ice maker 50, back into upper reservoir 34.

Moreover, appliance 10 may include a second valve 302 and a third valve 304. In particular, second valve 302 may be positioned at a drain hole 19 (FIG. 2) defined in container 14, e.g., generally between container 14 and lower reservoir 24, and third valve 304 may be positioned between lower reservoir 24 and pump 32. For example, second valve 302 and third valve 304 may be check valves or poppet valves, e.g., second valve 302 and third valve 304 may be configured to close in response to a user removing lower reservoir 24, reducing leakage of fluid from appliance 10 when lower reservoir 24 is removed.

Figure 5:
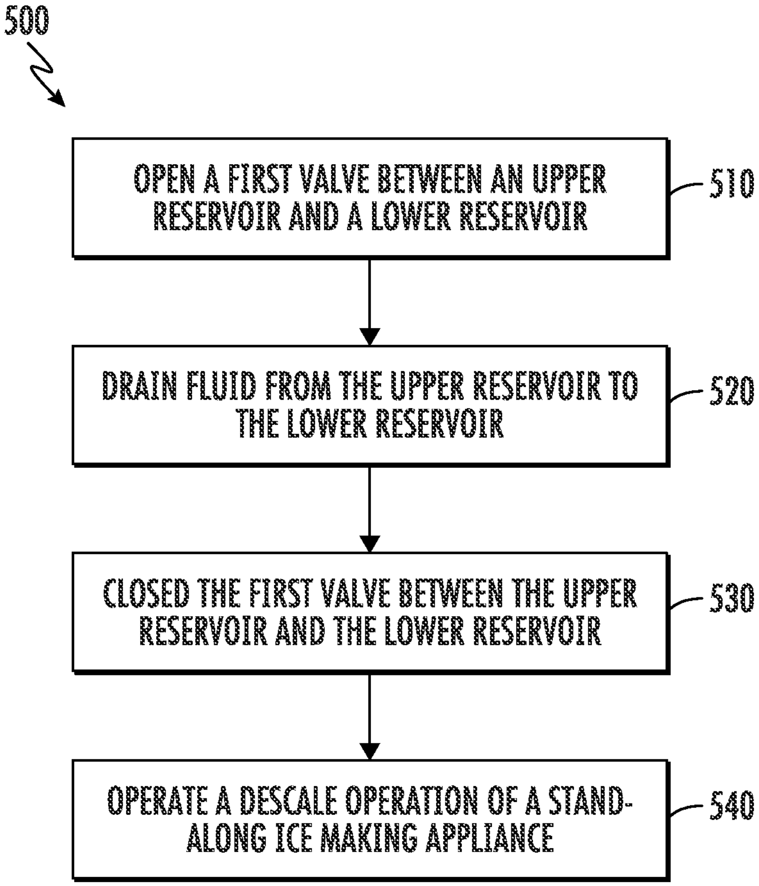
FIG. 5 provides a flowchart of an example method of operating a cleaning vessel according to aspects of the present disclosure.

Turning to FIG. 5, a flowchart of an example method (e.g., method 500) of operating appliance 10 will be described. Although the discussion below refers to the example method 500 of operating appliance 10, one skilled in the art will appreciate that the example method 500 is applicable to the operation of a variety of other appliances, such as other possible variations of the appliance. In example embodiments, the various method steps as disclosed herein may be performed (e.g., in whole or part) by controller 200, or another, separate, dedicated controller.

FIG. 5 depicts steps performed in a particular order for the purpose of illustration and discussion. Those of ordinary skill in the art, using the disclosures provided herein, will understand that (except as otherwise indicated) various example methods as may be disclosed herein are not mutually exclusive with each other, e.g., aspects of any one example method may be combined with aspects of any other example method, such that features illustrated or described as part of one embodiment can be used with another embodiment to yield a still further embodiment. Moreover, the steps of method 500 may be modified, adapted, rearranged, omitted, interchanged, or expanded in various ways without deviating from the scope of the present disclosure.

Referring now to FIG. 5, at (510), method 500 may generally include opening first valve 306 between upper reservoir 34 and lower reservoir 24. For example, first valve 306 may be opened via signal communication with controller 200 in response to receiving a user input at user interface 15. At (520), method 500 may generally include draining fluid from upper reservoir 34 to lower reservoir 24. For example, as a result of opening first valve 306, fluid held within upper reservoir 34 may drain via gravity to lower reservoir 24. In embodiments including the siphon, the method may include siphoning fluid from upper reservoir 34 into lower reservoir 24. In other words, the siphon action may be controlled via activating pump 32 in response to upper reservoir 34 being full of fluid, thereby flushing fluid from upper reservoir 34 and flushing the concentrated water hardness minerals down to lower reservoir 24. As stated above, during normal operation of appliance 10, water hardness minerals separated from the fluid used to make ice may accumulate within ice maker 50 and upper reservoir 34. While draining fluid from upper reservoir 34 to lower reservoir 24, water hardness minerals and contaminants may be flushed out of upper reservoir 34.

At (530), method 500 may generally include closing first valve 306 between upper reservoir 34 and lower reservoir 24. With first valve 306 closed after the fluid and loose sediments have accumulated in lower reservoir 24, a user may remove lower reservoir 24 and discard the contents of reservoir 24 in any suitable water receptacle, such as a kitchen sink, utility sink/tub, or waste water drain. With the contents discarded, the user may fill reservoir 24 with descaling solution, e.g., white vinegar and/or other similar solutions, such as any suitable acidic solution, including mixtures of one or more such solutions, which may, in some embodiments, be diluted with water, and replace the reservoir 24 back into appliance 10.

With reservoir 24 replaced in appliance 10, at (540), method 500 may generally include operating the descale operation of appliance 10. For example, as stated above, the descale operation may generally include pumping fluid, such as vinegar, from lower reservoir 24 to upper reservoir 34, through ice maker 50, back into upper reservoir 34. After the descale operation, method 500 may generally include repeating steps 510, 520, and 530, such that first valve 306 may be opened, the descale solution and additional sediments removed from ice maker 50 may drain from upper reservoir 34 into the lower reservoir 24, and first valve 306 may be closed. Accordingly, after the descaling operation has been completed and the descaling solution and additional water hardness minerals have accumulated in lower reservoir 24, the user may remove lower reservoir 24 and discard the contents of reservoir 24 in any suitable water receptacle.

Furthermore, after completing the descale operation and discarding the used descaling solution, the user may fill reservoir 24 with rinse fluid, such as water, and replace the reservoir 24 back into appliance 10. At this point, the descale operation may be repeated with the rinse fluid so that the appliance is thoroughly rinsed before returning to normal operation. For example, the descale operation with the rinse water may be repeated between one and five times, such as between one and four times, such as between one and three times in order to thoroughly rinse appliance 10. As such, after rinsing is complete, the user may fill reservoir 24 with tap water, or any suitable fluid for making nugget ice in the normal operation of appliance 10, and replace reservoir 24 into appliance 10.

Additionally or alternatively, some example embodiments may include opening first valve 306, or the siphon (in certain example embodiments), when the fluid level in lower reservoir 24 is below a threshold, such as below thirty percent full, such as below twenty percent full, such as below ten percent full, in order to dump fluid from upper reservoir 34 into lower reservoir 24. The user may then remove lower reservoir 24 and discard the fluid which includes the concentrated hardness minerals from upper reservoir 34, and then the user may refill the tank. Discarding the fluid in lower reservoir 24 when the water level is below the threshold may reduce hardness minerals from accumulating to the point of scaling within ice maker 50.

As may be seen from the above, provided may be a process of cleaning and descaling an ice making appliance by draining the upper reservoir, where hardness minerals may be concentrated, to a removable lower reservoir. A valve above the lower reservoir may be connected to a drain from the ice bin and another valve at the bottom of the lower reservoir may be connected to the pump. A drain line with an actuated valve may be positioned between the upper water reservoir and the lower reservoir and may be opened by a controller during the cleaning or descaling cycle. This process of cleaning an ice making appliance may advantageously reduce the manual intensity of traditional methods of cleaning/descaling ice making appliances.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A stand-alone ice making appliance, comprising:

a casing;

a user interface on the casing;

a container within the casing;

a lower reservoir removably mounted beneath the container;

an upper reservoir disposed within the casing, the upper reservoir fluidly coupled to the lower reservoir via a first valve;

an ice maker disposed within the casing;

a pump disposed within the casing, the pump in fluid communication with each of the lower reservoir, the upper reservoir and the ice maker, the pump operable to flow water from the lower reservoir to the upper reservoir and the ice maker; and a controller positioned in the casing, the controller in signal communication with the first valve between the upper reservoir and the lower reservoir, the controller configured to:

open the first valve between the upper reservoir and the lower reservoir;

drain fluid from the upper reservoir to the lower reservoir;

close the first valve between the upper reservoir and the lower reservoir; and operate a descale or cleaning operation of the stand-alone ice making appliance, wherein operating the descale operation further comprises the controller configured to pump fluid from the lower reservoir into the upper reservoir and through the ice maker, and wherein after the descale operation, the controller further configured to:

open the first valve between the upper reservoir and the lower reservoir;

drain fluid from the upper reservoir to the lower reservoir; and close the first valve between the upper reservoir and the lower reservoir.

2. The stand-alone ice making appliance of claim 1, wherein the first valve comprises a siphon extending into the upper reservoir, whereby fluid is siphoned from the upper reservoir into the lower reservoir.

3. The stand-alone ice making appliance of claim 1, wherein the container within the casing comprises a second valve fluidly coupled to a drain hole in the container.

4. The stand-alone ice making appliance of claim 3, wherein the second valve comprises a poppet valve configured to close in response to removal of the lower reservoir.

5. The stand-alone ice making appliance of claim 1, wherein the lower reservoir comprises a third valve fluidly coupled between the lower reservoir and the pump.

6. The stand-alone ice making appliance of claim 5, wherein the third valve comprises a poppet valve configured to close in response to removal of the lower reservoir.

7. The stand-alone ice making appliance of claim 1, wherein the first valve is positioned between the upper reservoir and the lower reservoir such that fluid drains via gravity when the first valve is open.

8. The stand-alone ice making appliance of claim 1, wherein the ice maker comprises an auger rotatably mounted therein.

9. The stand-alone ice making appliance of claim 1, wherein the controller is configured for repeating the descaling operation between one and five times.

10. A method of operating a stand-alone ice making appliance, the stand-alone ice making appliance comprising a casing, a user interface on the casing, a container within the casing, a lower reservoir removably mounted beneath the container, an upper reservoir disposed within the casing, the upper reservoir fluidly coupled to the lower reservoir via a first valve, an ice maker disposed within the casing, a pump disposed within the casing, the pump in fluid communication with each of the lower reservoir, the upper reservoir and the ice maker, the pump operable to flow water from the lower reservoir to the upper reservoir and the ice maker, and a controller positioned in the casing, the controller in signal communication with the first valve between the upper reservoir and the lower reservoir, the method comprising:

opening, by the controller, the first valve between the upper reservoir and the lower reservoir;

draining, by the controller, fluid from the upper reservoir to the lower reservoir;

closing, by the controller, the first valve between the upper reservoir and the lower reservoir; and operating, by the controller, a descale operation of the stand-alone ice making appliance, wherein operating the descale operation further comprises pumping fluid from the lower reservoir into the upper reservoir and through the ice maker, and wherein after the descale operation, the method further comprises:

opening the first valve between the upper reservoir and the lower reservoir;

draining fluid from the upper reservoir to the lower reservoir; and closing the first valve between the upper reservoir and the lower reservoir.

11. The method of claim 10, wherein the first valve comprises a siphon extending into the upper reservoir, whereby the method includes siphoning fluid from the upper reservoir into the lower reservoir.

12. The method of claim 10, wherein the container within the casing comprises a second valve fluidly coupled to a drain hole in the container.

13. The method of claim 12, wherein the second valve comprises a poppet valve configured to close in response to removal of the lower reservoir.

14. The method of claim 10, wherein the lower reservoir comprises a third valve fluidly coupled between the lower reservoir and the pump.

15. The method of claim 14, wherein the third valve comprises a poppet valve configured to close in response to removal of the lower reservoir.

16. The method of claim 10, wherein the first valve is positioned between the upper reservoir and the lower reservoir such that fluid drains via gravity when the first valve is open.

17. The method of claim 10, wherein the ice maker comprises an auger rotatably mounted therein.

18. The method of claim 10, further comprising repeating the descaling operation between one and five times.

* * * * *